(No Model.)

S. ETCHISON.
HAY PRESS.

No. 524,634.  Patented Aug. 14, 1894.

Witnesses:
Jas H Blackwood
H. P. Doolittle

Inventor,
Samuel Etchison
by Wm H Doolittle
Attorney.

UNITED STATES PATENT OFFICE.

SAMUEL ETCHISON, OF WEINER, ARKANSAS.

HAY-PRESS.

SPECIFICATION forming part of Letters Patent No. 524,634, dated August 14, 1894.

Application filed April 21, 1894. Serial No. 508,484. (No model.)

*To all whom it may concern:*

Be it known that I, SAMUEL ETCHISON, a citizen of the United States, residing at Weiner, in the county of Poinsett and State of Arkansas, have invented certain new and useful Improvements in Baling-Presses; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in hay baling presses, particularly adapted for use in connection with a hay raking and loading apparatus, but it is not necessary that an apparatus for raking and loading should be used in connection with my invention, for, as will be hereinafter pointed out, a hopper is provided and hay may be placed in this hopper by any convenient means.

The object of my invention is to produce a simple hay baling press so constructed that the hay may be baled out in the field without first being raked and stacked or stored away.

My invention is designed on the plan of compressing small charges from the hopper, in detail consecutively into a long, horizontal press-box by strokes of a reciprocating plunger.

My invention consists, generally stated, of a hopper, a press box, a horizontal plunger and means for actuating the same and a gathering and press arm all more fully hereinafter described and particularly claimed.

My invention is illustrated in the accompanying drawings, in which—

Figure 1:
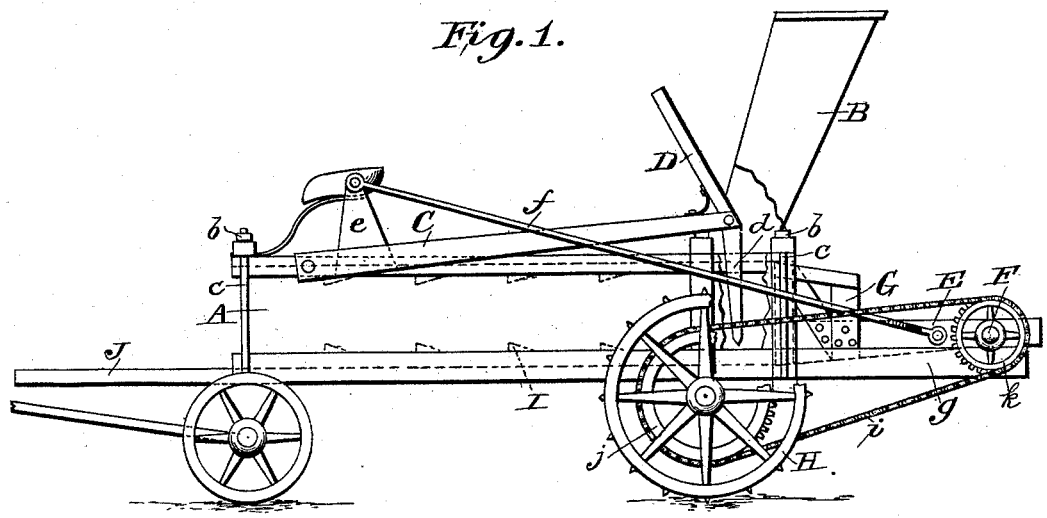
Figure 2:
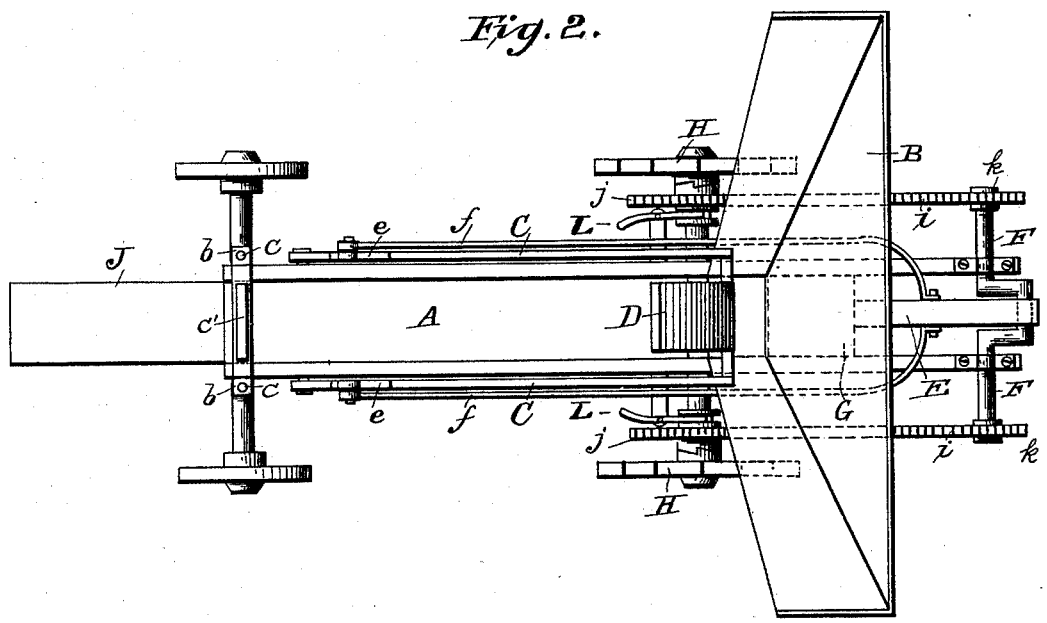

Figure 1 is a side view in elevation; Fig. 2, a plan view.

Referring to the drawings, A is a press-box, being preferably a long, horizontal, square cornered box. The press-box is so constructed that the size of the same may be easily changed for the purpose of pressing the bale more or less compactly and this is done by adjusting the nuts *b*, of the long bolts *c*, carrying the box head *c'* and connecting the top and bottom of the press-box A, at its front end.

B is a hopper for charging the box with hay or other material to be pressed and baled.

C, C are vertically moving beams having a cross piece, *d*, pivoted to their outer ends, the object of which piece, *d*, is to act as a feeder. It enters the forward side of the hopper at the base thereof, engages with a charge of the hay in the hopper, follows it and rams it down into the press-box.

The beams C, C are pivoted at their forward ends to the top of the press-box and to the rocking bars, *e, e*, and to these rockers, driving rods, *f, f*, are attached.

D is a guard which prevents the hay from getting out of its path in its passage from the hopper to the press-box. The guard D, is attached to the moving beams, C, C, and moves with them and with the feeder.

Connecting rods, *f, f*, having their forward ends fastened to the rockers, *e, e*, and their rear ends attached to a reciprocating horizontal plunger E, cause the beams, C, C, their attachments and the plunger to operate in unison. The plunger E is connected to the crank shaft F, and is driven by said shaft from gearing hereinafter described. On the front end of the plunger E a head G is secured, which head is to press against the incoming hay of the press-box when the plunger is moved forward. The crank shaft F, is supported on two arms, *g, g*, extending out from and attached to the under side of the bottom of the press box, A. On the opposite ends of the crank shaft F are mounted sprocket wheels, *k, k*, which receive and are driven by the sprocket chains, *i, i*. The sprocket chains, *i, i*, connect with larger sprocket wheels, *j, j*, on the axle of the rear truck wheels H. These wheels are provided with spurs on their tires to prevent their slipping and to insure a firm hold on the soil.

L L are clutches to throw the sprocket wheels, *j, j*, in and out of gear with the truck wheels.

To the sides of the press box, A, spring catches, I, are secured, the object of which is to prevent the hay from pushing backward toward the incoming charge. Extending out from the front of the press-box is a platform, J, to receive the completed bales as they are forced from the press-box.

When it is so desired a platform may be attached on either side of the press box for workmen to stand on to more easily pass metal ties or bale bands around the complete bale.

The operation of my invention may be described as follows:—The truck being in motion, hay from the hopper is fed into the press-box, the movements of the truck causing the various parts of the machine to be set in motion. The horizontal beams C, C, are raised and lowered. On their descent, the feeder D pulls and rams the hay from the hopper into the press-box, a certain portion or charge at a time, then the head of the plunger moves forward and presses the hay forward still farther into the press-box. In this manner a layer or section of the complete bale is formed. This section being pushed forward into the press box makes room for a new charge from the hopper. The new charge is acted on in the same manner and thus a completed bale is formed. When sufficient sections have been pressed to make a complete bale a movable head block is put into the press-box behind the bale and is forced forward with the hay. Thus several bales may be formed in one box.

The sides of the press-box A near its forward end should be left open to enable the bale ties or bands to be put around the complete bale before it is slid out onto the platform. It will be noticed that the operation of the baling press is continuous and as fast as a complete bale is formed and pushed out on the platform, another or other bales are in process of construction.

When it is desired to operate my invention to bale hay where the hay is in a stack or at one point and there is no necessity for moving from place to place, a pulley wheel can be readily attached to the crank shaft and the machine operated in that way.

Having thus described my invention, what I claim is—

A bale press comprising in combination a receiving box, a hopper to guide the material to be pressed into said box, vertically moving beams, C, pivoted to the top of the box, a guard, D, and feeder, $d$, secured to the outer ends of said beams, rocking bars, $e$, pivoted to said beams, connecting rods, $f$, a reciprocating horizontal plunger, E, the said connecting rods secured at one end to said rocking bars and at their opposite ends to said plunger, and sprocket wheels, chain and gearing for operating said parts in unison, substantially as and for the purpose described.

In testimony whereof I affix my signature in presence of two witnesses.

SAMUEL ETCHISON.

Witnesses:
H. W. FARVER,
O. M. BRADFORD.